(12) United States Patent
Borroni-Bird et al.

(10) Patent No.: US 7,096,986 B2
(45) Date of Patent: Aug. 29, 2006

(54) MOBILE CHASSIS AND INTERCHANGEABLE VEHICLE BODY WITH RAM AIR CIRCULATION SYSTEM

(75) Inventors: Christopher E. Borroni-Bird, Oakland Township, MI (US); Adrian B. Chernoff, Royal Oak, MI (US); Mohsen D. Shabana, Ann Arbor, MI (US); Robert Louis Vitale, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 219 days.

(21) Appl. No.: 10/309,795

(22) Filed: Dec. 4, 2002

(65) Prior Publication Data

US 2003/0168267 A1  Sep. 11, 2003

Related U.S. Application Data

(60) Provisional application No. 60/337,994, filed on Dec. 7, 2001.

(51) Int. Cl.
  *B60K 11/00* (2006.01)
(52) U.S. Cl. ..................... 180/68.1; 180/89.1
(58) Field of Classification Search ............... 180/68.1, 180/68.2, 68.3, 68.4, 2.2, 903, 89.1
  See application file for complete search history.

(56) References Cited

U.S. PATENT DOCUMENTS

| | | | |
|---|---|---|---|
| 2,079,218 A | 5/1937 | Ledwinka | 180/54 |
| 2,303,286 A | 11/1942 | Lake | |
| 2,319,002 A * | 5/1943 | Kramer | 454/141 |
| 2,367,904 A * | 1/1945 | Ulrich | 454/149 |
| 3,595,029 A * | 7/1971 | Lende, Jr. | 62/244 |
| 3,722,948 A | 3/1973 | Walsh et al. | |
| 4,307,575 A * | 12/1981 | Frosch et al. | 62/148 |
| 4,489,977 A | 12/1984 | Earing, Jr. | |
| 4,494,597 A * | 1/1985 | Fukami et al. | 165/41 |
| 4,593,609 A * | 6/1986 | Nagatomo et al. | 454/75 |
| 4,610,326 A * | 9/1986 | Kirchweger et al. | 180/68.1 |
| 4,681,178 A | 7/1987 | Brown | 180/68.3 |
| 4,763,564 A * | 8/1988 | Czarnecki et al. | 454/75 |
| 4,991,405 A * | 2/1991 | Sakano | 62/244 |
| 5,042,870 A | 8/1991 | Yura | 296/180.1 |
| 5,058,016 A | 10/1991 | Davidovitch | |
| 5,341,652 A * | 8/1994 | Tajiri et al. | 62/244 |
| 5,352,011 A | 10/1994 | Kihara et al. | |

(Continued)

FOREIGN PATENT DOCUMENTS

| | | |
|---|---|---|
| GB | 2 178 701 A | 2/1987 |
| GB | 2 207 096 A | 1/1989 |

*Primary Examiner*—Christopher P. Ellis
*Assistant Examiner*—Bridget Avery
(74) *Attorney, Agent, or Firm*—Kathryn A. Marra (57) ABSTRACT

An improved body configuration for a vehicle having an aerodynamic configuration and defining a pair of longitudinally extending air flow channels at the opposite sides of the body and inwardly of the outer periphery of the fenders for achieving good air flow. A front bridging member is formed that defines a grille having a pair of air scoops which form an aerodynamic device for assisting in the air flow. The engine compartment is defined by a rearwardly opening extractor section for drawing air from the engine compartment and a forwardly extending exhaust system receives the exhaust gases from the engine and discharges them to the atmosphere. A belly pan provides smooth air flow through the area beneath the vehicle and includes air scoops for receiving and discharging cooling air.

4 Claims, 4 Drawing Sheets

U.S. PATENT DOCUMENTS

| | | |
|---|---|---|
| 5,409,283 A | 4/1995 | Ban |
| 5,490,572 A * | 2/1996 | Tajiri et al. ................. 180/65.1 |
| 6,302,228 B1 * | 10/2001 | Cottereau et al. .......... 180/68.1 |
| 6,394,537 B1 | 5/2002 | DeRees |
| 6,435,584 B1 | 8/2002 | Bonnville |
| 6,443,253 B1 * | 9/2002 | Whitehead et al. ........ 180/68.1 |

* cited by examiner

MOBILE CHASSIS AND INTERCHANGEABLE VEHICLE BODY WITH RAM AIR CIRCULATION SYSTEM

CROSS-REFERENCE TO RELATED APPLICATIONS

This application claims the benefit of U.S. Provisional Application No. 60/337,994, filed Dec. 7, 2001, which is hereby incorporated by reference.

TECHNICAL FIELD

This invention relates to vehicle chassis with interchangeable bodies and an air circulation system where air can enter along the body or chassis sides and/or from the belly of the vehicle.

BACKGROUND OF THE INVENTION

Mobility, being capable of moving from place to place or of moving quickly from one state to another, has been one of the ultimate goals of humanity throughout recorded history. The automobile has likely done more in helping individuals achieve that goal than any other development. Since its inception, societies around the globe have experienced rates of change in their manner of living that are directly related to the percentage of motor vehicle owners among the population.

Prior art automobiles and light trucks include a body, the function of which is to contain and protect passengers and their belongings. Bodies are connected to the numerous mechanical, electrical, and structural components that, in combination with a body, comprise a fully functional vehicle. The nature of the prior art connections between a vehicle body and vehicular componentry may result in certain inefficiencies in the design, manufacture, and use of vehicles. Three characteristics of prior art body connections that significantly contribute to these inefficiencies are the quantity of connections; the mechanical nature of many of the connections; and the locations of the connections on the body and on the componentry.

In the prior art, the connections between a body and componentry are numerous. Each connection involves at least one assembly step when a vehicle is assembled; it is therefore desirable to reduce the number of connections to increase assembly efficiency. The connections between a prior art body and prior art vehicular componentry include multiple load-bearing connectors to physically fasten the body to the other components, such as bolts and brackets; electrical connectors to transmit electrical energy to the body from electricity-generating components and to transmit data from sensors that monitor the status of the componentry; mechanical control linkages, such as the steering column, throttle cable, and transmission selector; and ductwork and hoses to convey fluids such as heated and cooled air from a heating, ventilation and air conditioning system (HVAC) to the body for the comfort of passengers or from the vehicle so that waste heat produced by a fuel cell or propulsion system can be rejected or utilized as supplemental heat in the heating ventilation and air conditioning system (HVAC).

Prior art patents show various body configurations to enhance or direct air circulation in a vehicle. U.S. Pat. No. 2,079,218 issued to Ledwinka May 4, 1937, shows an air scoop at the top rear of a vehicle; U.S. Pat. No. 4,681,178 issued to Brown Jul. 21, 1987, shows an air scoop for use in combination with a vehicle having an engine air intake port located in a side panel of the vehicle body; and U.S. Pat. No. 5,042,870 issued to Yura Aug. 27, 1991, shows an improved body configuration for a vehicle having an aerodynamic configuration and defining a pair of longitudinally extending air flow channels at the opposite sides of the body and inwardly of the outer periphery of the fenders for achieving good air flow. A front bridging member is formed that complies with bumper height regulations and forms an aerodynamic device for assisting in the air flow. The engine compartment is defined by a rearwardly opening extractor section for drawing air from the engine compartment and a forwardly extending exhaust system receives the exhaust gases from the engine and discharges them to the atmosphere. A belly pan provides smooth air flow through the area beneath the vehicle.

The location of the connections on prior art vehicle bodies and componentry also results in inefficiencies. In prior art body-on-frame architecture, a connection on the body is often distant from its corresponding connection on the componentry; therefore, long connectors such as wiring harnesses and cables must be routed throughout the body from componentry. The vehicle body of a fully-assembled prior art vehicle is intertwined with the componentry and the connection devices, rendering separation of the body from its componentry difficult and labor-intensive, if not impossible. The use of long connectors increases the number of assembly steps required to attach a vehicle to its componentry.

SUMMARY OF THE INVENTION

A self-contained mobile chassis or rolling platform has substantially all of the mechanical, electrical, and structural componentry necessary for a fully functional vehicle, including at least an energy conversion or propulsion system having a powertrain and powertrain cooling loop. The chassis further includes a suspension and wheels, a steering system, a braking system, a heating, venting and air cooling system (HVAC), and means for controlling each of the systems. The chassis has a simplified, standardized interface with attachment couplings to which vehicle bodies of substantially varying design can be attached. By-wire technology is utilized to eliminate mechanical control linkages.

The heating, ventilation, and air conditioning (HVAC) system is packaged in the rolling platform or chassis and is connected to the powertrain cooling loop for waste heat circulation and to an air cooling system having an electric air cooling (A/C) compressor. Supplemental heating elements can be utilized for additional heating loads. Waste heat from the powertrain cooling loop can be utilized with a heat exchanger in the HVAC system. Airflow from the HVAC system flows into a selected vehicle body through single or multiple passthroughs from the rolling platform. The air is then distributed through a ducting system in the vehicle body. The ducting system for the different vehicle bodies to be interchanged can utilize the respective floor structure, seat structure, body pillars and roof rails, and other designed forms where the airflow can be positioned and directed as desired for each vehicle body.

Typically, in vehicle transportation air is taken in at the front of the vehicle for the radiator. In the design of this invention, not necessarily for fuel cells or specifically for the rolling platform or chassis, air can enter along the body or chassis sides and/or from the belly of the vehicle. Air may exit along the sides, at the rear, from the belly, or into the body for interior functionality like heating, cooling, and ventilation. Air enters by design of functional air scoops and heat sinks. Upon entry, the air is utilized by the components like the radiator, the fuel cell, the air filter, the HVAC system, etc. Air entry may be propelled by the pressure differential within the ducting design to motorized fans. Air exit may be conducted along the sides, at the rear, from the belly, etc. Benefits of utilizing this design are for the benefit of creating a larger air intake surface as well as the advent or redesign of the front grill and side profiles of vehicle design.

The invention reduces the amount of time and resources required to design and manufacture new vehicle bodies. Body designs need only conform to the simple attachment interface of the chassis where the ducting connects, eliminating the need to redesign or reconfigure expensive components for each different body design.

The invention also allows a multitude of body designs to share a common chassis, enabling economies of scale for major mechanical, electrical, and structural components. Thus, interchangeability of body and chassis is enhanced by utilizing the air ducts of one in the air circulation or waste heat rejection of the other.

Couplings, exposed and unobstructed, increase manufacturing efficiency because attachment of a body to the chassis requires only engagement of the couplings to respective complementary couplings on a vehicle body.

Vehicle owners can increase the functionality of their vehicles at a lower cost than possible with the prior art because a vehicle owner need buy only one chassis upon which to mount a multitude of body styles or designs.

Accordingly, a vehicle includes chassis structure defining an enclosed packaging space. The body structure is separable from and interchangeable with the chassis structure and defines an enclosed cockpit space. At least one of the chassis structure and body structure defines an interface therebetween for at least partially defining the enclosed cockpit space and the enclosed packaging space. A first passageway is defined by the body structure and configured to receive ram air for circulation throughout the cockpit space and a second passageway is defined by the chassis structure and configured to receive ram air for circulation through the packaging space.

The invention may also include such a vehicle, wherein the definition of the first passageway includes a pair of spaced ram air inlets, a pair of spaced hollow longitudinal roof rails respectively in communication with the pair of ram air inlets, and a pair of spaced hollow transverse roof rails in communication with the pair of spaced hollow longitudinal roof rails to form a circumambient air flow circuit having outlet openings in communication with the enclosed cockpit space.

The invention may also include such a vehicle, wherein the definition of the first passageway includes a bypass in communication with the second passageway for at least partially supplying the ram air for circulation through the packaging space.

The invention may also provide such a vehicle which includes an energy conversion system operable for rejecting waste heat, and wherein the configuration of the second passageway includes a chassis air scoop at one end for receiving relatively cool ram air and a chassis air scoop at the opposite end for exhausting the ram air received along with the waste heat rejected.

The invention may also include a vehicle which comprises chassis structure defining an enclosed packaging space. The body structure is separable from and interchangeable with the chassis structure and defines an enclosed cockpit space having a floor. At least one person-supporting seating apparatus is in the cockpit space and is mounted with respect to the floor. At least one heat exchanger is in the packaging space and mounted with respect to the floor and in heat exchange relationship with the cockpit space for conditioning air for a person supported by the seating apparatus. At least one chassis-attachment air flow coupling is mountable with respect to the floor for joining the cockpit space and heat exchanger in such heat exchange relationship.

Another invention is a movable vehicle chassis which comprises a frame defining a plurality of open spaces. A plurality of heat producing components are in respective ones of the open spaces. A belly pan sufficiently embraces the frame to at least partially define a duct enclosing the heat producing components. Inlet and outlet air scoops are sufficiently spaced apart in the duct to cause the heat produced by the components to be rejected from the chassis as waste heat when the vehicle moves.

The invention may also provide a movable vehicle chassis which includes a body that is separable from and interchangeable with the chassis and defines a cockpit space configured to receive ram air for circulation through the cockpit space when the vehicle moves; and an air flow coupling between the body and the chassis for joining the cockpit space to the open spaces in the chassis for bypassing at least some of the ram air received through the cockpit space into the open spaces of the chassis.

More particularly, the vehicular chassis of this invention is also characterized by novel waste heat rejection. The chassis has a frame defining a plurality of open spaces, a suspension system including at least three wheels, a steering system having steering components, mounted with respect to the frame and operably connected to at least one wheel, and an energy conversion system having energy conversion system components, mounted with respect to the frame and operably connected to at least one wheel. A waste heat rejection system having waste heat rejection system components is operably connected to the energy conversion system. The waste heat rejection components include a coolant circulation system and a heat exchanger adjacent the energy conversion system. The coolant circulation system or cooling loop is operably connected to the heat exchanger. The chassis further includes an HVAC system having HVAC system components which are operably connected to the coolant circulation system. The chassis also includes a braking system having braking components, mounted with respect to the frame and operably connected to at least one wheel. A plurality of body-attachment couplings are mounted with respect to the frame and include a plurality of body-retention couplings, a control signal receiver coupling, and an HVAC fluid coupling; wherein the control signal receiver coupling is characterized as control-by-wire and is operably connected to the braking system, steering system, and propulsion system; and wherein the HVAC system is operably connected to the HVAC fluid coupling and the control signal receiver coupling; and wherein the steering components, energy conversion system components, waste heat rejection system components, braking components, HVAC system components, and body attachment couplings are mounted within the open spaces and do not protrude significantly outside the frame or the interface between the chassis and the selected one of a plurality of interchangeable vehicle body configurations.

The above structural objects and technical features and advantages, and other objects, of the present invention are readily apparent from the following detailed description of the best mode for carrying out the invention when taken in connection with the accompanying drawings.

DETAILED DESCRIPTION OF THE PREFERRED EMBODIMENT

Figure 1:
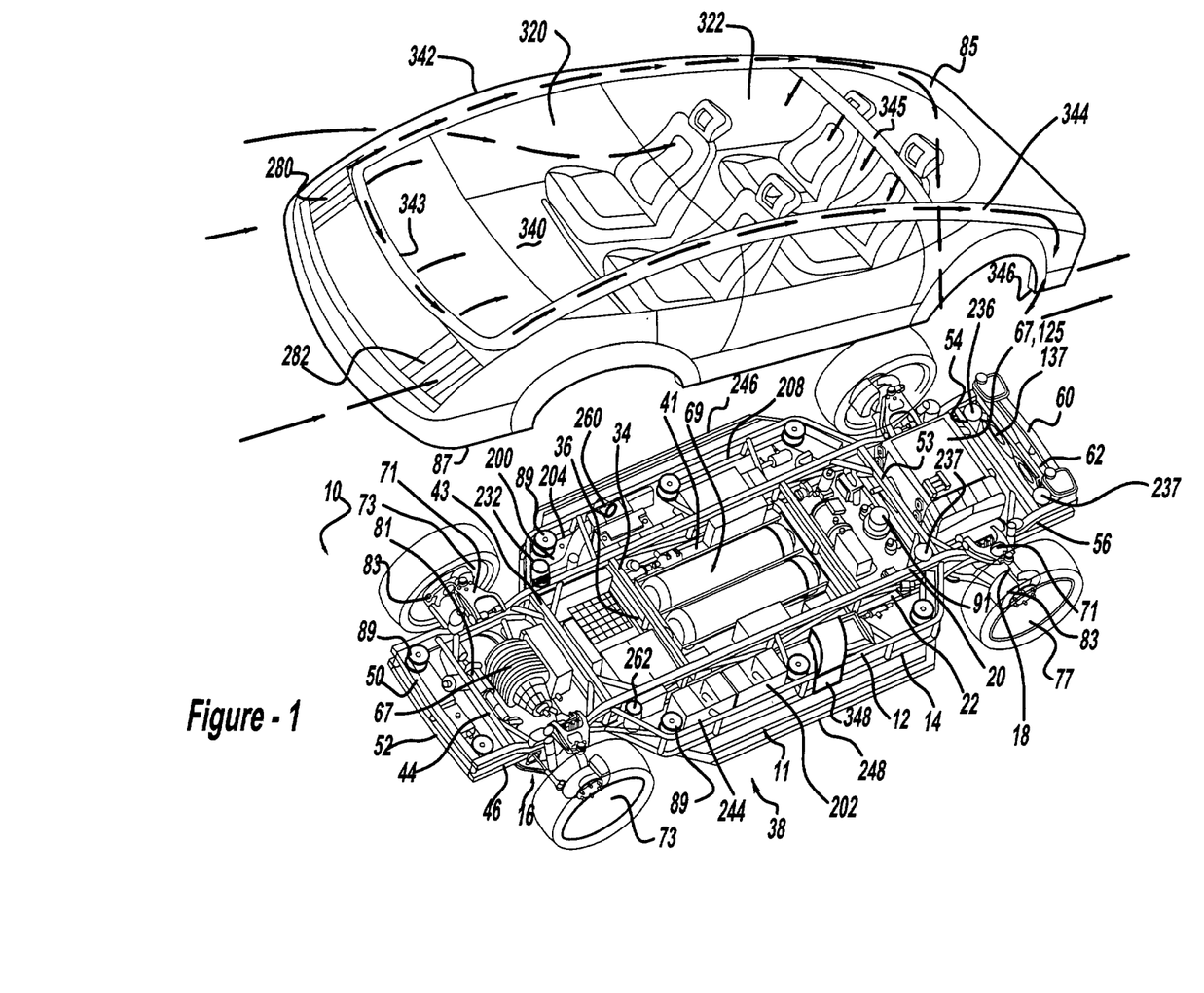
FIG. 1 is an exploded perspective view of a mobile chassis and an interchangeable body showing air scoops for exterior air entry, cockpit air flow, air flow within the body, and hot exhaust air flow for waste heat rejection.

Referring to FIG. 1, the preferred embodiment is a vehicle 8 having a chassis 10, also referred to as the "rolling platform," which includes a structural frame 11. The structural frame 11 comprises a series of interconnected structural elements including upper and lower side structural elements 12 and 14 that comprise a thin "sandwich"-like construction. Elements 12 and 14 are substantially rigid tubular (or optionally solid), members that extend longitudinally between the front and rear axle areas 16, 18, and are positioned outboard relative to similar elements 20, 22. The front and rear ends of elements 12, 14 are angled inboard, extending toward elements 20 and 22 and connecting therewith prior to entering the axle areas 16, 18. For added strength and rigidity a number of vertical and angled structural elements extend between elements 12, 14, 20 and 22. Similar to the elements 12, 14, 20 and 22, which extend along the left side of the rolling platform 10, a family of structural elements extend along the right side thereof.

Lateral structural elements 34, 36 extend between elements 20 and 22, respectively nearer the front axle area 16 and extend between elements 20 and 22, respectively nearer the rear axle area 18, thereby defining a mid-chassis space 41. The front axle area 16 is defined in and around structural elements 43, 44 at the rear and front, and on the sides by structural elements 46, which may be extensions of the elements 20 and 22, or connected therewith. Forward of the front axle area, a forward space is defined between element 44 and elements 50, 52. The rear axle area 18 is defined in and around structural elements 53, 54 at the front and rear, and on the sides by structural elements 56, which may be extensions of the elements 20, 22 or connected therewith. Rearward of the rear axle area, a rearward space is defined between element 54 and elements 60, 62. The frame thus defines a plurality of open packaging spaces 38 which define a passageway, and an upper chassis face with connective elements adapted to connect with a lower body face with connective elements on interchangeable vehicle body pods as the connective elements mate at an external interface 87.

Figures 2, 3:
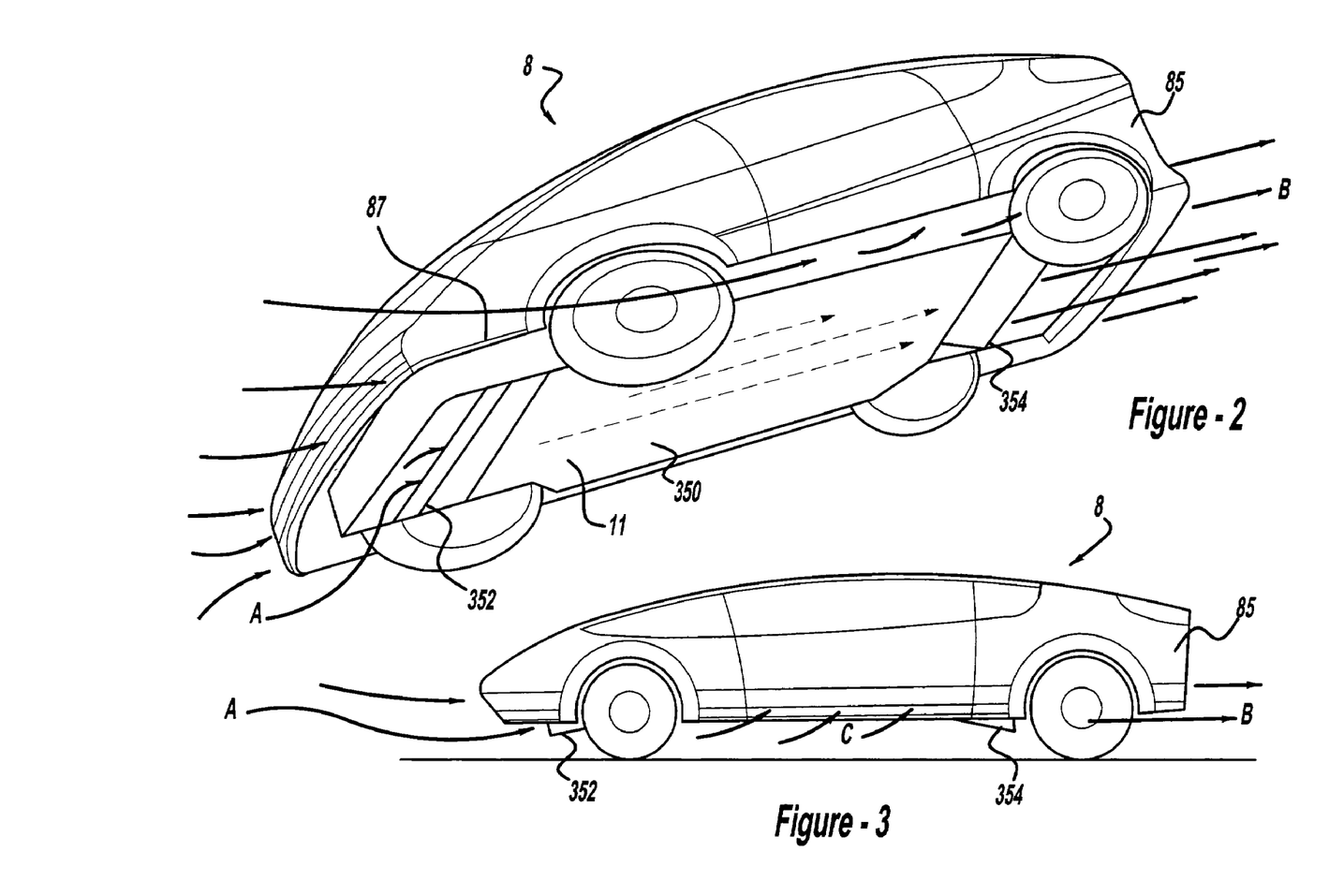
FIG. 2 is a left front perspective of the vehicle from the chassis bottom showing chassis air scoops for cooling chassis componentry.
FIG. 3 is a left side elevational view of the vehicle in FIG. 2.

The structural frame 11 provides a rigid structure to which an energy conversion system 67, energy storage system 69, suspension system 71 with wheels 73, 77 steering system 81, braking system 83, heating, ventilation and air conditioning or cooling system (HVAC) 200, and waste heat rejection system 202 are mounted. The frame is configured to support an attached body 85, as shown in FIG. 1. A person of ordinary skill in the art will recognize that the structural frame 11 can take many different forms, in addition to the cage-like structure of the preferred embodiment. For example, the structural frame 11 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal, with other formations to accommodate various system components as shown in FIG. 2. The HVAC system 200 may also be installed in the vacant cockpit space 340 of body 85, in front of the cockpit seating area 320.

Figures 4, 5:
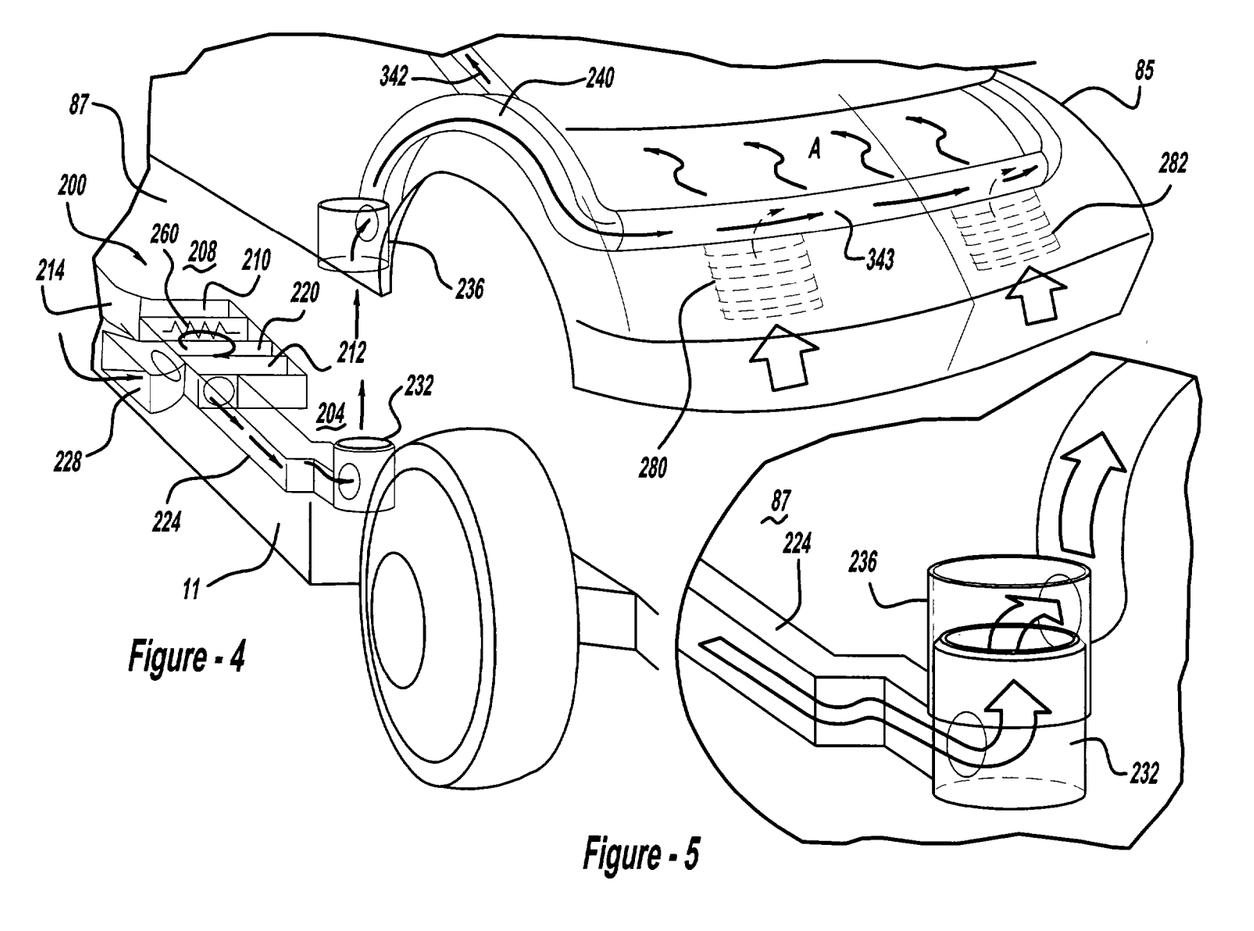
FIG. 4 is a fragmentary exploded perspective view of a mobile chassis and interchangeable body having an easily and unobstructably connectable and disconnectable ducting system for the HVAC system.
FIG. 5 is an enlarged fragmentary perspective of the disconnectable connector for the ducting system in FIG. 4.

The HVAC system 200 will be described with reference to FIGS. 1, 4 and 5. The HVAC system is packaged in structural frame 11 in packaging spaces 204, 208. The HVAC system includes a compressor 210, an evaporator 212, condenser 214 and an air flow device such as an air circulation fan 220. An air duct 224 connects the HVAC system in fluid flow communication with an ambient air inlet 228, the evaporator 212 and a connective element or coupling portion 232 adapted to connect with an interchangeable vehicle body 85. Vehicle body or body pod 85 includes a connective element or coupling portion 236 which leads to a vehicle body distribution duct 240 which may be configured in vehicle body structure so that conditioned air is sufficiently distributed throughout the vehicle to provide comfort for the passengers. Connective elements 232 and 236 are configured and positioned to mate easily and unobstructedly at the interface 87 when the chassis and body pod are brought together. Vehicle body 85 may also include fans (not shown) in its structural members (roof, pillars, etc) which work in combination with chassis fan 220 to distribute conditioned air through transverse hollow rails, ducts, or passageways 343, 345 where needed for circumambient air circulation in the interior passenger compartment or cockpit space 340. The cockpit space includes a front seat portion 320 and back seat portion 322.

With reference to FIG. 1, vehicle body 85 may include air scoops 280, 282. The scoops receive ram air into roof structure ducts or passageways 342, 344. The ram air received flows through the ducts to body outlet couplings at 346 on each side which are connectable with chassis inlets 236, 237 connected to heat exchanger 137. The ram air from air scoops 280, 282 may thus be used to cool chassis componentry. Some ram air may be directed into passenger compartment 340 through passageways 343, 345. Thus, the pair of spaced hollow longitudinal roof rails 342, 344 respectively in communication with the pair of ram air inlets 280, 282, and the pair of spaced hollow transverse rails 343, 345 in communication with the pair of spaced hollow longitudinal rails form a first passageway as a circumambient air flow circuit having outlet openings in communication with the enclosed cockpit space. Also, the first passageway 343 includes a bypass 347 in communication with a second passageway defined by the chassis structure for at least partially supplying the ram air for circulation through the packaging space. This ram air flow generally bypasses the HVAC system 200 in the chassis and may leave the vehicle through the connective elements or coupling portions 236, 237 which are connected through the rear bumper or facia to the atmosphere. An additional air scoop at 348 or on a belly pan can also be used to take in air for cooling the energy storage system 69 if needed.

FIG. 2 shows vehicle body 85 with an air scoop modification of the chassis 10 shown in FIG. 1. The modification includes a belly pan 350 having a forward inlet air scoop 352 and a rearward outlet air scoop 354. As shown, the exterior relatively cool ambient air flow A is ram air which enters the packaging spaces through air scoop 352 of the structural frame 11. It then wends its way through the packaging spaces and leaves or exhausts from the chassis through the rearward air scoop 354. The air flow through the chassis cools the functional componentry within the packaging spaces and exhausts the heated air B to the rear of the vehicle. Some exterior air flow C may wipe over the exterior of the chassis and assist in cooling the componentry. With the chassis air scoops of FIG. 2, the air scoop 348 for the energy storage system 69 in FIG. 1 may not be needed.

Figures 6, 7:
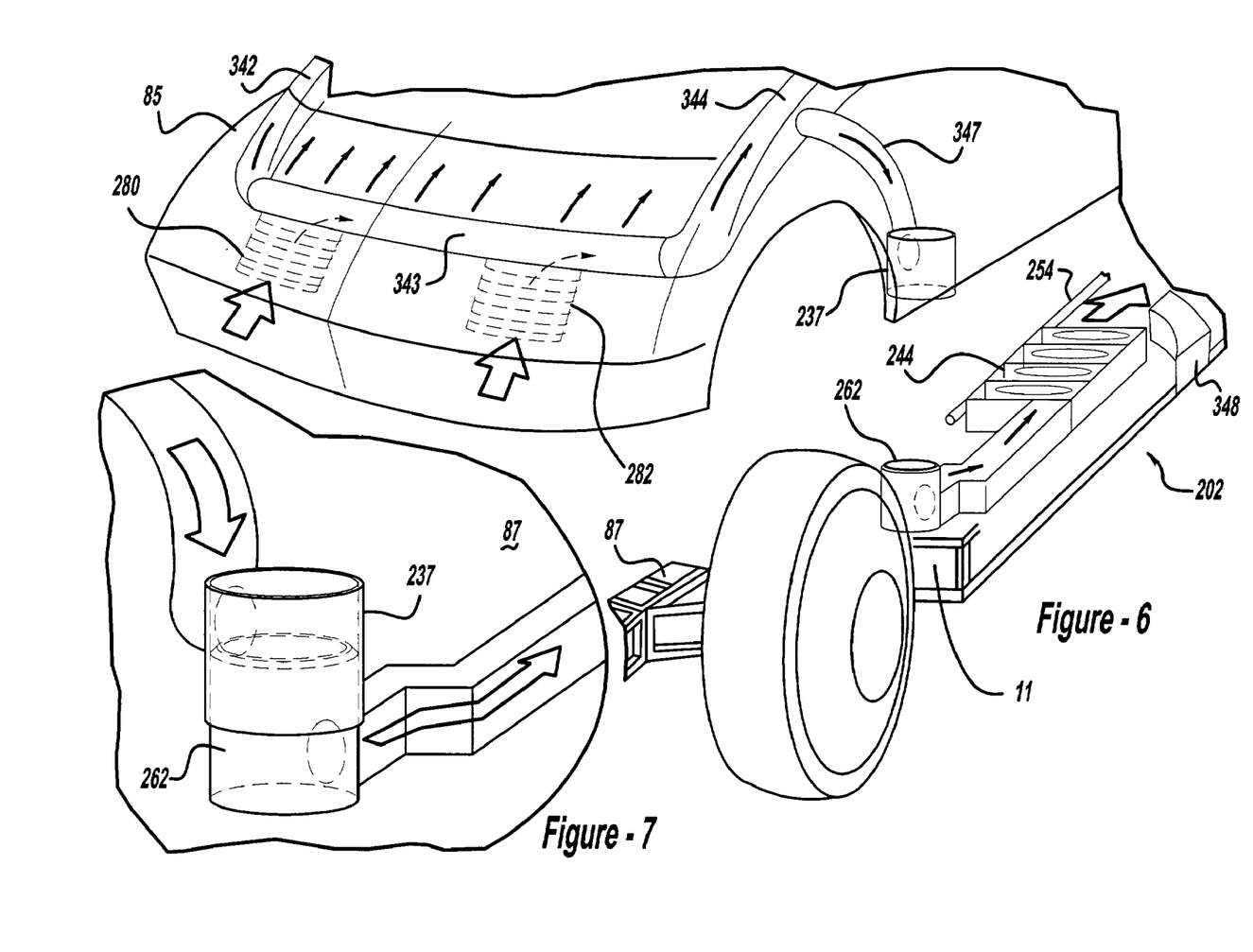
FIG. 6 is a fragmentary exploded perspective view of a mobile chassis and interchangeable body having an easily and unobstructably connectable and disconnectable ducting system for the manifolded heat exchangers in a packaging space of the chassis.
FIG. 7 is an enlarged fragmentary perspective of the disconnectable connector for the ducting system in FIG. 6.

The waste heat rejection system 202 will be described with reference to FIGS. 1, 6 and 7. Waste heat is generated in the energy conversion system 67, the energy storage system 69, fuel cell stack 125, and engine 164, if any. The system includes heat exchangers 244 in a packaging space or spaces in the chassis, heat exchangers or cooling fins 246, 248 on the sides of the chassis, and radiator or heat exchanger 137 at the rear of the chassis, all of which are or may be in a fluid flow cooling loop 254. The cooling loop includes fluid flow conduits (not shown in their entirety) which are threaded through the available packaging spaces in the frame 11 to the cooling fins 246, 248 and the forced air cooled radiators or heat exchangers 137. Thus, the need to cool componentry creates waste heat which is shared between the HVAC system 200 and the waste heat rejection system 240. Some of the waste heat may be utilized in the HVAC system 200 for heating. The remainder of the heat generated by the chassis componentry is rejected to the atmosphere as exhaust air. A supplemental heating element 260 may also be included in the HVAC system, should the waste heat be insufficient to sufficiently warm the passenger compartment.

Accordingly, and viewed in light of the foregoing, the interface 87, although preferably flat, is an imaginary surface that follows the upwardly facing contours of the chassis frame 11 or upper chassis face with all of its systems mounted therein and the downwardly facing contours of the vehicle body 85 or lower body face. It is at this imaginary surface that the vehicle chassis meets and coextensively, immediately mates with each and every one of the complementary and selectable vehicle bodies or body pods. The solution to this expeditious mating is having first connective elements (couplings) 232, 262 on the chassis and second connective elements (connectors) 236, 237 on the vehicle body which meet substantially and unobstructedly at the same place on the interface whenever a selected vehicle body or body pod from the selectable inventory of vehicle bodies is to be mated with the chassis. Thus the connective elements are preferably positioned on the chassis so that they do not protrude significantly beyond the imaginary surface so that mating is accomplished quickly and easily.

As shown in FIG. 1, the load-bearing body-retention couplings 89 are engageable with complementary attachment couplings or connectors (not shown) on a vehicle body 85 and function to physically fasten the vehicle body 85 to the chassis 10. Those skilled in the art will recognize that a multitude of fastening and locking elements may be used and fall within the scope of the claimed invention. In the preferred embodiment, the load-bearing body-retention couplings 89 are support brackets with bolt holes. Rubber mounts (not shown) located on the support brackets dampen vibrations transmitted between the body and the chassis.

In sum, the foregoing defines a vehicle 8 which has a chassis structure 10 defining an enclosed packaging space 38 and body structure 85 separable from and interchangeable with the chassis structure and defining an enclosed cockpit space 340. The chassis structure 10 and body structure 85 define an interface 87 therebetween for at least partially defining the enclosed cockpit space 340 and the enclosed packaging space. A first passageway 342, 344 is defined by the body structure and configured to receive ram air for circulation throughout the cockpit space 340. A second passageway 38 is defined by the packaging spaces of the chassis structure and is configured to receive ram air for circulation through the packaging space 38. The first passageway includes a pair of spaced ram air inlets 280, 282, a pair of space hollow longitudinal roof rails 342, 344 respectively in communication with the pair of ram air inlets, and a pair of spaced hollow transverse rails 343, 345 in communication with the pair of spaced hollow longitudinal roof rails to form a circumambient air flow circuit having outlet openings in communication with the enclosed cockpit space. The transverse rail 343 of the pair of space hollow transverse rails is in air flow communication with the front seat or front longitudinal portion of the cockpit space while the transverse rail 345 of the pair of hollow transverse rails is in air flow communication with the back seat or back longitudinal portion of the cockpit space.

While the best modes for carrying out the invention have been described in detail, those familiar with the art to which this invention relates will recognize various alternative designs and embodiments for practicing the scope of the invention within the scope of the appended claims.

The invention claimed is:

1. A vehicle comprising:
   chassis structure defining an enclosed packaging space;
   body structure separable from and interchangeable with the chassis structure and defining an enclosed cockpit space;
   at least one of the chassis structure and body structure defining an interface therebetween for at least partially defining the enclosed cockpit space and the enclosed packaging space;
   a first passageway defined by the body structure and configured to receive ram air for circulation throughout the cockpit space; and
   a second passageway defined by the chassis structure and configured to receive ram air for circulation through the packaging space;
   wherein the definition of the first passageway includes a pair of spaced ram air inlets, a pair of spaced hollow longitudinal roof rails respectively in communication with the pair of ram air inlets, and a pair of spaced hollow transverse rails in communication with the pair of spaced hollow longitudinal roof rails to form a circumambient air flow circuit having outlet openings in communication with the enclosed cockpit space.

2. The vehicle of claim 1, wherein one of the pair of spaced hollow transverse rails is in air flow communication with one longitudinal portion of the cockpit space while the other one of the pair of hollow transverse rails is in air flow communication with another longitudinal portion of the cockpit space.

3. The vehicle of claim 2, wherein the one longitudinal portion of the cockpit space includes front seat structure and the other longitudinal portion of the cockpit space includes back seat structure.

4. A vehicle comprising:

chassis structure defining an enclosed packaging space;

body structure separable from and interchangeable with the chassis structure and defining an enclosed cockpit space;

at least one of the chassis structure and body structure defining an interface therebetween for at least partially defining the enclosed cockpit space and the enclosed packaging space;

a first passageway defined by the body structure and configured to receive ram air for circulation throughout the cockpit space;

a second passageway defined by the chassis structure and configured to receive ram air for circulation through the packaging space;

said first passageway including a pair of spaced ram air inlets, a pair of spaced hollow longitudinal roof rails respectively in communication wit the pair of ram air inlets, and a pair of spaced hollow transverse rails in communication wit the pair of spaced hollow longitudinal roof rails to form a circumambient air flow circuit having outlet openings in communication with the enclosed cockpit space;

said one of the pair of spaced hollow transverse rails is in air flow communication with one longitudinal portion of the cockpit space while the other one of the pair of hollow transverse rails is in air flow communication with another longitudinal portion of the cockpit space; and said one longitudinal portion of the cockpit space including front seat structure and the other longitudinal portion of the cockpit space including back seat structure.

* * * * *